(12) United States Patent
Goder et al.

(10) Patent No.: US 6,272,026 B1
(45) Date of Patent: Aug. 7, 2001

(54) PSEUDO PUSH-PULL DC:DC POWER CONVERTER TOPOLOGY

(75) Inventors: Dimitry Goder; Anatoly Shteynberg, both of San Jose, CA (US)

(73) Assignee: Swtich Power, Inc., Campbell, CA (US)

( * ) Notice: Subject to any disclaimer, the term of this patent is extended or adjusted under 35 U.S.C. 154(b) by 0 days.

(21) Appl. No.: 09/670,801

(22) Filed: Sep. 26, 2000

(51) Int. Cl.$^7$ ................................................. H02M 3/335
(52) U.S. Cl. ............................................. 363/25; 363/133
(58) Field of Search ................................. 363/24, 25, 26, 363/131, 133, 134, 40, 41

(56) References Cited

U.S. PATENT DOCUMENTS

| | | | |
|---|---|---|---|
| 4,408,267 | * | 10/1983 | Pruitt ........................................ 363/17 |
| 5,903,448 | * | 5/1999 | Davila, Jr. ............................... 363/24 |

* cited by examiner

*Primary Examiner*—Adolf Deneke Berhane
(74) *Attorney, Agent, or Firm*—Flehr Hohbach Test Albritton & Herbert LLP

(57) ABSTRACT

A pseudo-push-pull DC:DC converter topology replaces one primary switching transistor with a high speed passively switched diode coupled between one end of a transformer first primary winding and ground. A second primary winding is coupled to ground via a solid state switch that is driven with a control circuit that outputs a single drive signal of slightly less than 50% duty cycle. The other ends of the first and the second transformer primaries are coupleable to a source of Vin. The topology includes a gapped transformer whose transformer core stores sufficient electromagnetic energy when the solid state switch is turned-on by the control circuit to drive a load coupled to the transformer secondary when the solid state switch is turned-off. When the solid state switch is turned-off by the control circuit, the diode self-biases on, coupling the first transformer primary winding between Vin and ground, as though a perfectly driven solid state switch were turned-on. Converter secondary or output voltage rectification is very efficient in that a pseudo-push-pull signal is generated, without requiring a complicated prior art push-pull control circuit on the primary side.

20 Claims, 3 Drawing Sheets

US 6,272,026 B1

PSEUDO PUSH-PULL DC:DC POWER CONVERTER TOPOLOGY

FIELD OF THE INVENTION

The present invention relates generally to DC:DC power converters, and more specifically to providing a topology having the advantage of push-pull without requiring a push-pull drive that must output precise 50%:50% duty cycle drive signals.

BACKGROUND OF THE INVENTION

Circuitry to implement DC:DC converters is known in the art. Such circuits receive an input-side DC voltage that is sampled or chopped and transformer-coupled to an output side. On the output side, the waveform is rectified and filtered to provide a regulated output voltage that may be greater than or less than the input voltage. Feedback from output to input can be used to regulate the sampling duty cycle or frequency to provide an acceptably efficient DC:DC converter in a small form factor.

FIG. 1A depicts a so-called voltage-fed push-pull DC:DC converter 10, according to the prior art, having an input side 20 and an output side 30, generally separated by a transformer T1. The input side 20 of the converter is coupled to a source of DC potential Vin. Potential Vin is shown coupled to a pre-regulator 40 whose output potential is controlled within a known tolerance. Although pre-regulator regulator 40 is depicted in the figures, in general it is optional and may be dispensed with if Vin is sufficiently controlled. The output potential from preregulator regulator 40 is sampled or chopped using push-pull switching transistors Q1, Q2 and respective transformer T1 primary windings W1, W2. As best seen in FIG. 1B, a control circuit 50 provides complementary drive signals to the input leads of Q1, Q2 such that when Q1 is on, Q2 is off, and vice versa. Although Q1 and Q2 are shown as switching an end of primary windings W1, W2 to ground potential, it is understood that ground potential implies a stable potential. Stated differently, if desired a potential other than 0 V DC might instead be switchably coupled to an end of primary windings W1 and W2. This understanding that ground is simply a convenient reference potential shall apply throughout this disclosure.

Dual center-tapped secondary transformer windings are shown on output side 30 of DC:DC converter 10, although other winding configurations could instead be used, e.g., a single center-tapped secondary winding could instead be used. Transformer T1's center-tapped secondaries W3-1, W3-2, and W4-1, W4-2 step-up or step-down the chopped waveforms, which are rectified by diodes D1, D2 and capacitor C1, and by diodes D3, D4 and capacitor C2. Other rectification configurations may of course be used, e.g., full-bridge rectification using four diodes. The secondary windings may output different magnitudes Vo1, Vo2 and the number of windings may be greater or less than two. In some configurations, a feedback loop (not shown) may be coupled between the secondary output voltages and control circuit 50.

As shown in FIG. 1B, in an ideal case in which circuit 50 generates drive signals θ1 and θ2 that are precisely 180° out of phase, switch Q1 will be on when Q2 is off, and vice-versa. As a result, operating efficiency is high, and the filtering requirements on the output side are minimized in that reduction of switching transients will be the primary task of the rectification and filter circuitry. In the configuration shown, output filtering is provided by output capacitors C1 and C2. If desired, inductors could also be used to provide L-C low-pass output filtering. The balanced nature of the output voltage signals and the relative minimal requirements on the output filter are beneficial features of push-pull topography.

But in practice, it is very difficult to provide an inexpensive control circuit 50 that can reliably output two perfectly complementary drive signals θ1, θ2. If, for example, circuit 50 outputs complementary signals that are slightly out of phase, e.g., where phase shift Δ is non-zero, then there will be times of durations Δ when both Q1 and Q2 are simultaneously on. As a result, operating efficiency will suffer, and more severe switching transients must be filtered from the Vo1, Vo2 signal(s). Thus, much consideration must be given to the design and implementation of a push-pull control circuit 50 to minimize the undesired effects of overlapping drive signals. The result can be a relatively complete control circuit 50 whose component cost can be relatively large when compared to the cost of all components in the overall DC:DC converter. Further, even with an ideal control circuit, body effect diodes are inherently present in Q1 and Q2, and tend to conduct unwanted current, thus decreasing circuit efficiency.

Thus, there is a need for a DC:DC converter topology that provides the efficiency and output filtering advantages associated with a true push-pull configuration, but without requiring a control circuit that can output perfectly complementary drive signals.

The present invention provides such a topology, referred to herein as a pseudo push-pull topography.

SUMMARY OF THE PRESENT INVENTION

The present invention provides a DC:DC converter topology that offers the switching efficiency and output filtering advantages of a push-pull converter, but without requiring a control circuit that can deliver perfect complementary drive signals. The invention uses a converter transformer T1' with a gapped transformer core, and replaces one of the two primary switches with a passive switch such as a diode. The first and second converter transformer primary windings (W1, W2) are each coupled at one end to Vin. The second end of the first primary winding is coupled to ground (or other reference potential) via a switch Q1 under command of a control circuit that outputs a single pulse train control signal θ1 of slightly less than 50% duty cycle. The second end of the second winding is connected to a diode DX1 whose anode end is connected to ground (or other reference potential).

When θ1 goes high, Q1 turns on and Vin will be coupled across primary winding W1. Electromagnetic energy is instantly transferred from the primary side to the secondary side of transformer T1', and some electromagnetic energy will be stored within the gapped transformer core. Circuit design is such that sufficient joules of electromagnetic energy are stored in the gapped transformer core to meet the energy requirements for a predicted maximum secondary (output) load, to be delivered when Q1 is turned off. When θ1 turns Q1 off, a fraction of the electromagnetic energy stored in the gapped transformer core turns-on diode DX1, which causes Vin to be coupled across primary winding W2. Any excess stored electromagnetic energy not required by the secondary load will be transferred elsewhere automatically, e.g., to the primary side. Duty cycle is preferably slightly less than 50%, and DX1 biases itself off before θ1 subsequently again turns-on Q1.

The present invention produces what is essentially a push-pull output, with the output rectification filter advantages that accompany a typical push-pull circuit. However the control circuit is simplified in that a single control signal θ1 is generated, as contrasted with the need to generate complementary non-overlapping control signals in the prior art. Further, a single switch Q1 is required, the second switching action being performed by the diode DX1. The resultant topology thus offers filtering and EMI advantages of a true push-pull configuration, but without the expense and difficulty associated with generating true push-pull drive signals.

Other features and advantages of the invention will appear from the following description in which the preferred embodiments have been set forth in detail, in conjunction with the accompanying drawings.

DETAILED DESCRIPTION OF THE PREFERRED EMBODIMENT

Figure 1A:
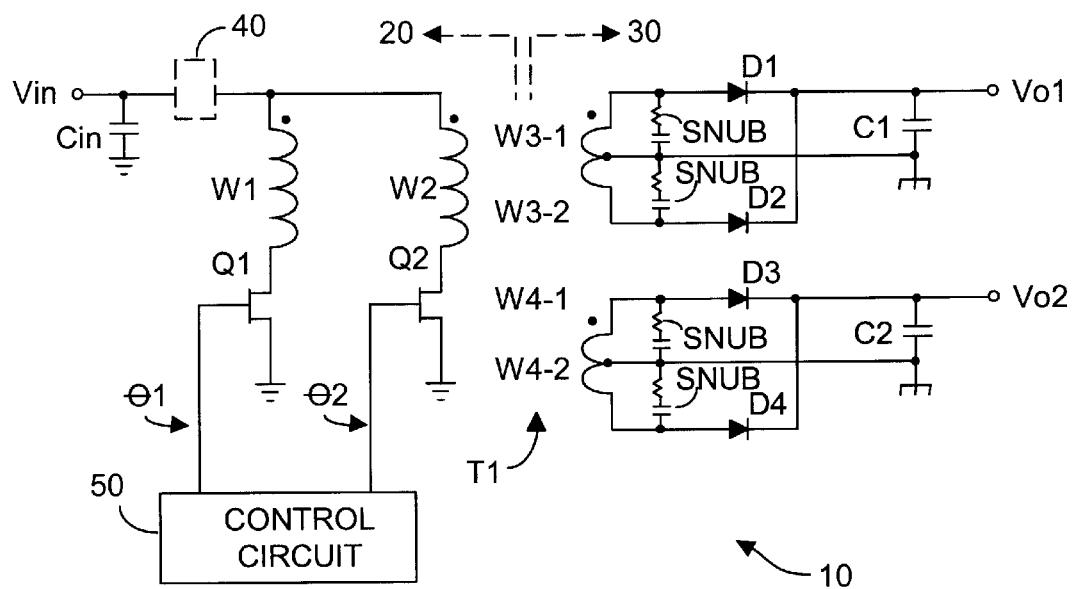
FIG. 1A depicts a push-pull DC:DC converter, according to the prior art.
Figure 1B:
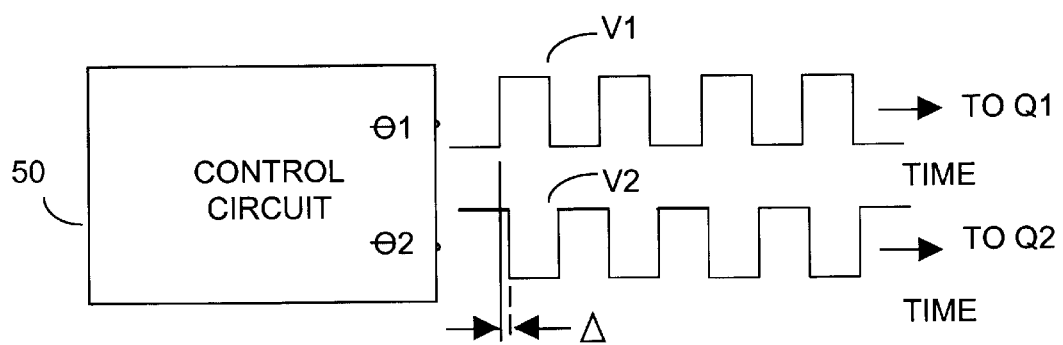
FIG. 1B depicts the 50%:50% drive signals required for the prior art push-pull converter of FIG. 1A.
Figure 2A:
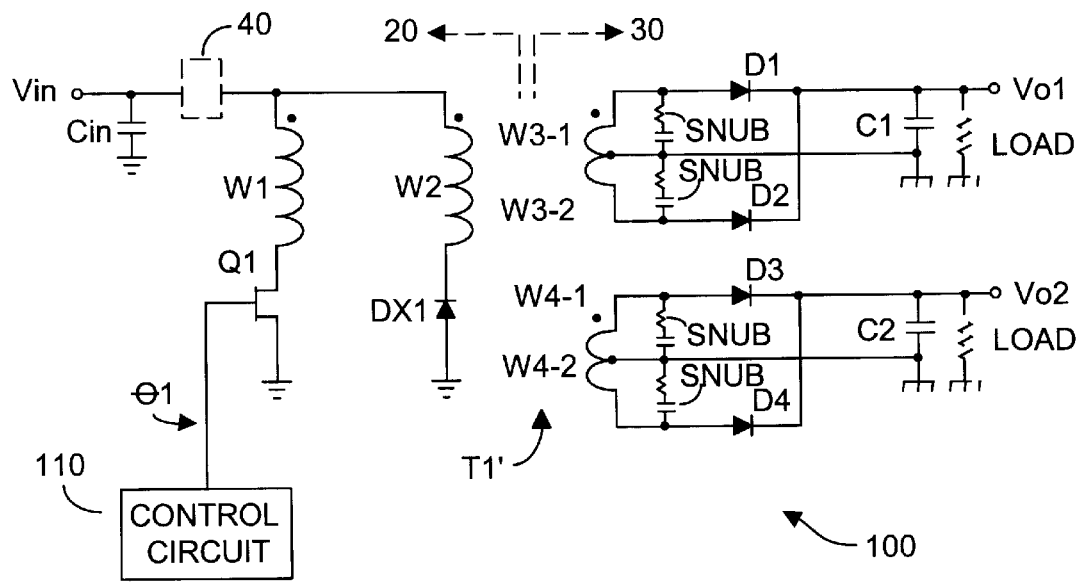
FIG. 2A depicts a pseudo push-pull DC:DC converter topology, according to the present invention.

FIG. 2A depicts a pseudo push-pull DC:DC converter topology 100, according to the present invention. Note that half of the drive stage is similar or identical to what was described with respect to prior art FIG. 1A.

Figure 2B:
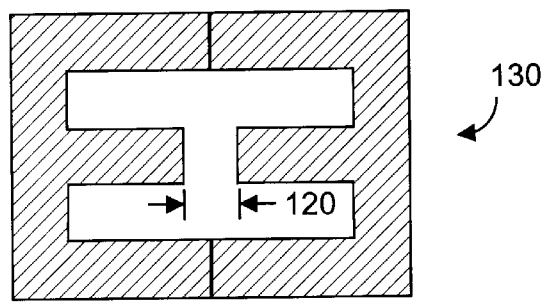
FIG. 2B depicts a split core transformer as is used in the pseudo push-pull DC:DC converter of FIG. 2A.

Drive switch Q1, typically a MOS transistor, is controlled by a slightly less than 50% duty cycle pulse train drive signal θ1, that is output by a control circuit 110. However in lieu of a second drive switch Q2 (as found in the prior art configuration 10 of FIG. 1A), DC:DC converter 100 uses a passive switch, such as a diode DX1, preferably a Shottkey diode. A further difference between the present invention of FIG. 2A and the prior art push-pull configuration of FIG. 1A is that the converter transformer T1' will have a gap 120 in the transformer core 130, as shown in FIG. 2B, whereas transformer T1 in FIG. 1A is typically not gapped. Although FIG. 2A shows the lower end of primary windings W1 and W2 as being coupleable to ground, it is understood that a reference potential other than 0 VDC might instead be used.

In the prior art configuration of FIG. 1A, a non-gapped transformer T1 meant that as Q1 or Q2 switched-on to apply input voltage across a primary transformer winding, the resultant electromagnetic energy transferred instantly to the secondary side of T1. Stated differently, there was no intentional temporary storage of electromagnetic energy within the core of the transformer T1 shown in FIG. 1A.

Figure 2C:
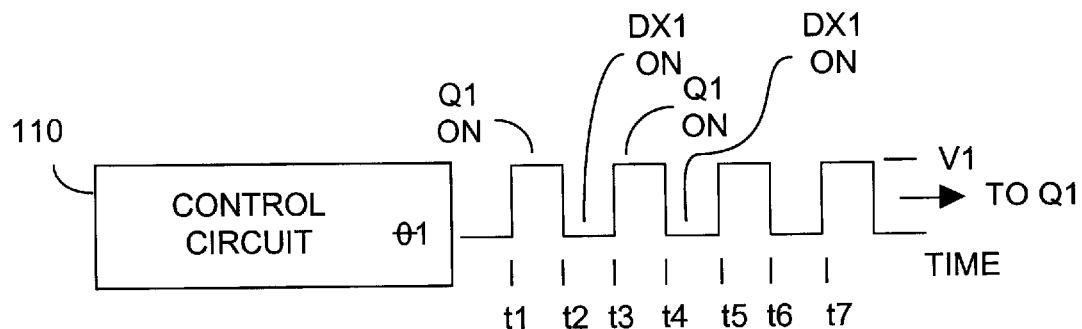
FIG. 2C depicts the single drive signal required for the pseudo push-pull DC:DC converter of FIG. 2A.

Referring now to FIG. 2B, those skilled in the art will appreciate that the presence of an air gap 120 in core 130 permits transformer T1' to store electromagnetic energy within the core. Thus, in the configuration of FIG. 2A, when control circuit 110 outputs a drive signal θ1 causing switch Q1 to turn-on, Vin is switched across primary winding W1 (neglecting the small ohmic drain-source voltage drop associated with switch Q1). When Q1 is turned-on, electromagnetic energy is instantly transferred to the secondary side of converter 100, but some electromagnetic energy will be stored within gapped core 130 of transformer T1'. Thus, electromagnetic energy is stored in core 130 during time intervals t1–t2, t3–t4, etc., as shown in FIG. 2C.

In the prior art configuration of FIG. 1A, during time intervals t2–t3, t4–t5, etc., the θ1 control signal would turn Q1 off, and a 180° out-of-phase θ2 control signal would turn a companion switch Q2 on, assuming of course that prior art control circuit 50 could provide ideal complementary non-overlapping control signals θ1, θ2.

But in the present invention, during the off-portions of the θ1 control signal (t2–t3, t4–t5, etc.), when Q1 is off, at least a fraction of the electromagnetic energy stored in gapped transformer core 130 is used to start conduction in diode DX1, which fraction may in fact be 1, e.g., 100%. Referring to FIG. 2C, DX2 begins to turn-on at times t2, t4, t6, etc. When diode DX1 is turned-on it is forward biased, essentially clamping the lower end of primary winding W2 to ground (neglecting a perhaps 0.3 VDC forward bias diode voltage drop). As a result, Vin is impressed across secondary winding W2. Thus, during time intervals t2–t3, t4–t5, etc., at least a fraction of the electromagnetic energy stored in transformer core 130 transfers to the secondary side of transformer T1'. Any excess joules of stored energy not required by the output LOAD(s) will be transferred elsewhere, typically back to the input side and input capacitor C1. Since duty cycle of control circuit 110 preferably is close to but not quite 50.0%, diode DX1 will self-bias off before θ1 again turns-on Q1.

The design of converter 100 is such that when Q1 is turned-on by control signal θ1, the amount of electromagnetic energy stored in transformer core 130 will be sufficient to ensure that the required output power is delivered to the load(s), LOAD(s), coupled to the transformer secondary. In an ideal case, the amount of electromagnetic energy stored when Q1 is turned-on would precisely equal the joules required by LOAD(s) when Q1 is turned-off, assuming zero internal transformer (or other) losses. If excess electromagnetic energy is stored in the core beyond what is delivered to LOAD(s), the surplus energy will be transferred automatically to the primary side of the converter circuit, e.g., to filter capacitor Cin.

The above-described self-switching action causes passive diode switch DX1 to act as though it were a solid state switch, somewhat akin to Q2 in FIG. 1A, being driven by a complementary control, akin to signal θ2 in FIG. 1A, that forward biases the diode during time intervals t2–t3, t4–t5, etc. But advantageously, the problems associated with implemented a perfect push-pull control circuit are avoided by the present invention. In practice, if control circuit 110 outputs a 2 MHz pulse train, a Shottkey diode DX1 can commence conduction within a few ns from when Q1 turns-off. Preferably the amount of electromagnetic energy transferred during the time that Q1 is on and that Q1 is off is substantially equal. In practice, more energy will tend to be stored in core 130 that will be instantly transferred when Q1 is on. Understandably having to transfer (or dump) excess stored energy back to the primary side of transformer T1' is counterproductive to efficient DC:DC conversion, as such transfers of excess energy will increase ohmic losses in the transformer windings, with resultant heat generation. In the preferred embodiment, a design margin of about 15% was used, e.g., core 130 stored approximately 115% of the electromagnetic energy required for delivery to the LOAD (s) when Q1 was turned-off.

The overall design of converter 100 is dependent upon many factors, including magnitude of Vin, required Vo1, Vo2 (if Vo2 is present), and magnitude of output loads. The size of core 130 will limit the ability of transformer T1' to store energy, and as noted, a 15% or so design margin is suggested as a design starting point. Thickness of core 130 in practice will be perhaps 0.25" to about 0.5", gap 120 will be in the range of about 2 mil to 20 mils, and material for core 130 will be rated typically at Al≈63 nH/turn to about Al ≈1,200 nH/turn. The above data is exemplary, and other converter designs may employ different core sizes and core materials.

Thus, pseudo push-pull DC:DC converter 100 uses a gapped transformer to store electromagnetic energy when Q1 is turned on by control signal θ1 generated by a simplified control circuit 110. As shown by FIG. 2C, control circuit 110 only has to output a single control signal, θ1, of magnitude V1 (without limitation, typically about 3 VDC to about 12 VDC), whose duty cycle preferably is slightly less than 50.0%, typically within a range of about 45% to about 49%, and preferably about 48%. Duty cycle preferably is less than 50% to ensure that core 130 of transformer T1' will reset itself, which is to say that diode DX1 will self-bias off before θ1 turns-on Q1.

Figure 2D:
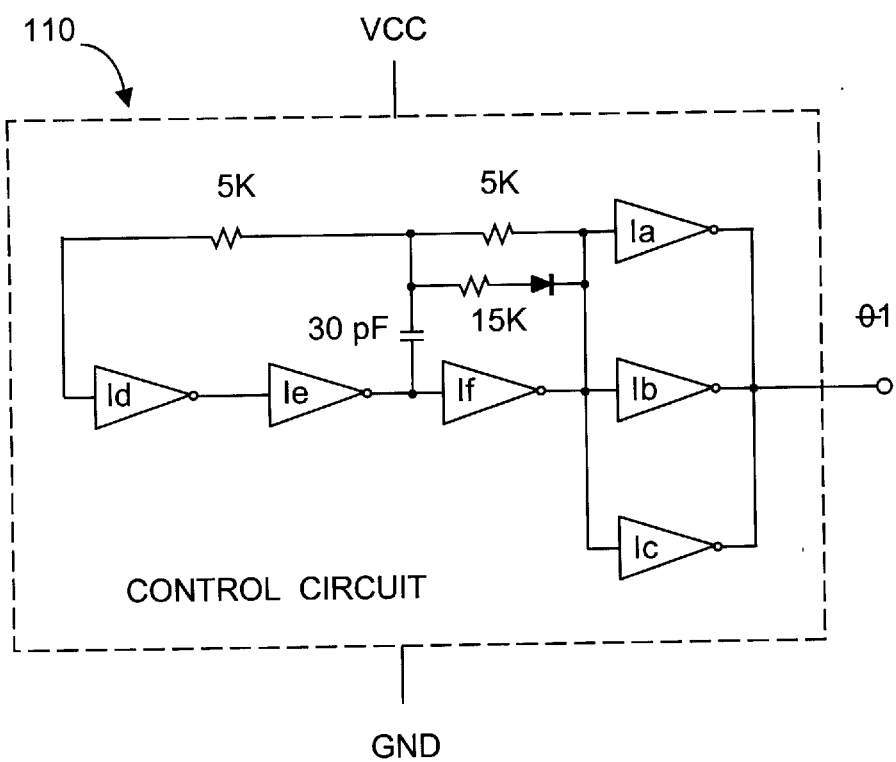
FIG. 2D is a preferred embodiment of a single-ended control driver circuit, useable with the configuration of FIG. 2A, according to the present invention.

FIG. 2D depicts a preferred embodiment of control circuit 110. It is noted that the control circuit may be fabricated using a few passive components (e.g., resistors, a timing capacitor, and a diode) and a single CMOS IC chip comprising hex inverters 1a–1f. The simple circuitry of FIG. 2D outputs the θ1 single drive signal shown in FIG. 2C.

Several advantages in the topology of FIG. 2A are immediately seen. Control circuit 110 is simplified because it need only output a single drive signal θ1 to the input node (typically gate node) of the single switch Q1. As such, problems associated with designing prior art control circuits 50, which must output two drive signals θ1 and θ2 precisely 180° out of phase, without pulse overlap, are eliminated. On a relative basis, if the cost of implementing prior art control circuit 50 is, say, $1.50, the cost of implement control circuit 110 is perhaps $0.10, yet reliability of control circuit 110 is better than that of control circuit 50. Substituting a diode DX1 for solid state switch Q2 (in FIG. 1A) also provides a less expensive converter in that a Shottkey diode can be less costly than a MOS switch Q2. Adding a gapped transformer T1' in the present invention to store electromagnetic energy used to cause diode DX1 to begin conduction does not contribute to the overall cost of implementing converter 100, when compared to the cost of transformer T1 in prior art circuit 10.

The present invention is especially useful for relatively low power applications in which a small form factor may be important. Thus, typical magnitude of Vin might be 5 V, and Vo1, Vo2 might be in the 24 V to 100 V range, 5 W output power. In general, relatively high magnitude Vo1, Vo2 (e.g., 20 VDC) can be expensive to filter in that C1, C2 must be able to reliably standoff the high voltage. For example, while aluminum electrolytic output filter capacitors at C1, C2 can withstand high voltage, such capacitors are not very reliable and have a relatively large form factor. By preserving a desirable push-pull output waveform, the present invention advantageously requires DC output filtering.

Modifications and variations may be made to the disclosed embodiments without departing from the subject and spirit of the invention as defined by the following claims.

What is claimed is:

1. A pseudo push-pull DC:DC converter comprising:
 a transformer with a gapped core having wound thereon at least first and second transformer primary windings, said windings switchably coupleable between a source of voltage Vin and a reference potential, said transformer further comprising at least one transformer secondary transformer winding coupled to an output voltage Vout node;
 a control circuit outputting a single-phase drive signal having a drive signal duty cycle approximating but less than about 50%;
 a first switch, having a input coupled to an output of said control circuit, coupled to the first primary winding to conduct current therethrough responsive to said drive signal from said control circuit;
 a passively controlled second switch coupled to the second primary winding to control current flow therethrough;
 wherein when said control circuit turns said first switch on, current flows through said first primary winding, electromagnetic energy is delivered to a load coupled to said Vout node, and electromagnetic energy is also stored within said gapped core of said transformer; and
 when said control circuit turns-off said first switch, said second switch biases on and conducts current through said second primary winding, and at least a fraction of stored said electromagnetic energy is delivered to said load.

2. The DC:DC converter of claim 1, wherein said first switch has a characteristic selected from a group consisting of (a) said first switch is a solid state switch, and (b) said first switch is a transistor.

3. The DC:DC converter of claim 1, wherein said gapped core is selected to store sufficient electromagnetic energy to satisfy requirements of said load when said first switch is turned-off.

4. The DC:DC converter of claim 1, wherein said second switch has a characteristic selected from a group consisting of (a) said second switch is a diode, and (b) said second switch is a Shottkey diode.

5. The DC:DC converter of claim 1, wherein said first switch is coupled in series with the said primary winding, and said second switch is coupled in series with said second primary winding.

6. The DC:DC converter of claim 1, wherein said first switch is coupled between said first primary winding and said reference potential, and said second switch coupled between said second primary winding and said reference potential.

7. The DC:DC converter of claim 1, wherein said transformer core has at least one characteristic selected form a group consisting of (a) a core thickness of about 0.25" to about 0.5", and (b) a core gap in a range of about 0.002" to about 0.020".

8. The DC:DC converter of claim 1, wherein said transformer core has an Al in a range of about 63 nH/turn to about 1,200 nH/turn.

9. The DC:DC converter of claim 1, wherein said reference potential is ground.

10. The DC:DC converter of claim 1, wherein said duty cycle is in a range of about 45% to about 49.5%.

11. The DC:DC converter of claim 1, wherein said control circuit is implementable with a single hex inverter integrated circuit.

12. A DC:DC converter providing a push-pull output voltage at a Vout node, comprising:
 a transformer with a gapped core having wound thereon at least first and second transformer primary windings, said windings switchably coupleable between a source of voltage Vin and a reference potential, said transformer further comprising at least one transformer secondary transformer winding providing an output voltage to said Vout node;

a control circuit outputting a single-phase drive signal having a drive signal duty cycle approximating but less than about 50%;

a solid state switch coupled between the first primary winding and said reference potential, and coupled to receive said single-phase drive signal so as to be switched on and off at said duty cycle;

a diode coupled between the second primary winding and said reference potential;

wherein when said control circuit turns said solid state switch on, current flows through said first primary winding and electromagnetic energy is delivered to a load coupled to said Vout node, and electromagnetic energy is also stored within said gapped core; and when said control circuit turns said solid state switch off, said diode biases on and conducts current through said second primary winding, and at least a fraction of stored said electromagnetic energy is delivered to said load.

13. The DC:DC converter of claim 12, wherein said gapped core is selected to store sufficient said electromagnetic energy to satisfy requirements of a load coupled to said Vout node when said solid state switch is turned-off.

14. The DC:DC converter of claim 12, wherein said diode is a Shottkey diode.

15. The DC:DC converter of claim 12, wherein said solid state switch is a MOS transistor.

16. The DC:DC converter of claim 12, wherein said transformer core has at least one characteristic selected from a group consisting of (a) a core thickness of about 0.25" to about 0.5", (b) a core gap in a range of about 0.002" to about 0.020", and (c) an Al in a range of about 63 nH/turn to about 1,200 nH/turn.

17. A method of implementing a DC:DC converter to deliver a push-pull-like output at an output voltage Vout node without providing a push-pull drive control circuit, the method comprising the following steps:

(a) providing a transformer with a gapped core having wound thereon at least first and second transformer primary windings coupleable between a source of Vin and a reference potential, said transformer further including at least one transformer secondary transformer coupled to said Vout node;

(b) actively coupling the first primary winding between said source of Vin and said reference potential with a duty cycle approximately but less than about 50% to switcheably conduct current therethough; and (c) coupling a diode between the second primary winding and said reference voltage;

wherein when said first primary winding is switcheably coupled to conduct current, electromagnetic energy is delivered to a load coupled to said Vout node, and electromagnetic energy is also stored within said gapped core; and when said first primary winding is switchably coupled as to not conduct current, said diode biases on and conducts current through said second primary winding, and at least a fraction of stored said electromagnetic energy is delivered to said load.

18. The method of claim 17, wherein step (a) includes selecting said gapped core to store sufficient said electromagnetic energy to satisfy requirements of a load coupled to said Vout output node when said first primary winding is switchably coupled as to not conduct current.

19. The method of claim 17, wherein at step (b), said duty cycle is in a range of about 45% to about 49.9%.

20. The method of claim 17, wherein step (a) includes providing said transformer with at least one characteristic selected from a group consisting of (i) a core thickness of about 0.25" to about 0.5", (ii) a core gap in a range of about 0.002" to about 0.020", and (iii) an Al in a range of about 63 nH/turn to about 1,200 nH/turn.

* * * * *

UNITED STATES PATENT AND TRADEMARK OFFICE
CERTIFICATE OF CORRECTION

Page 1 of 1

PATENT NO. : 6,272,026 B1
DATED : August 7, 2001
INVENTOR(S) : Dimitry Goder and Anatoly Shteynberg It is certified that error appears in the above-identified patent and that said Letters Patent is hereby corrected as shown below:

<u>Title page,</u>
Item [73] Assignee, please correct the spelling of "Swtich" to -- Switch --.

Signed and Sealed this

Twenty-first Day of May, 2002

Attest:

JAMES E. ROGAN
*Director of the United States Patent and Trademark Office*

*Attesting Officer*